United States Patent [19]
Prill et al.

[11] Patent Number: 5,848,072
[45] Date of Patent: Dec. 8, 1998

[54] METHOD OF AND APPARATUS FOR COMMUNICATING MESSAGES

[75] Inventors: Mark E. Prill, Lake Zurich; Robert K. Krolopp, Riverwoods, both of Ill.

[73] Assignee: Motorola, Inc., Schaumburg, Ill.

[21] Appl. No.: 513,380

[22] Filed: Aug. 10, 1995

[51] Int. Cl.[6] .................................. H04J 3/16; H04J 3/22
[52] U.S. Cl. .......................... 370/471; 375/356; 370/503
[58] Field of Search .................................. 375/219, 354, 375/356, 359; 370/471, 474, 475, 503, 438, 520

[56] References Cited

U.S. PATENT DOCUMENTS

| | | | |
|---|---|---|---|
| 3,916,095 | 10/1975 | Weber et al. | 178/6 |
| 4,085,448 | 4/1978 | Kogge | 364/900 |
| 4,280,221 | 7/1981 | Chun et al. | 375/17 |
| 4,369,516 | 1/1983 | Byrns | 375/110 |
| 4,373,183 | 2/1983 | Means et al. | 364/200 |
| 4,385,382 | 5/1983 | Goss et al. | 370/96 |
| 4,390,963 | 6/1983 | Puhl et al. | 364/900 |
| 4,393,501 | 7/1983 | Kellogg et al. | 371/33 |
| 4,517,669 | 5/1985 | Freeburg et al. | 370/82 |
| 4,654,655 | 3/1987 | Kowalski | 340/825.5 |
| 4,663,499 | 5/1987 | Duval | 178/2 R |
| 4,680,787 | 7/1987 | Marry | 379/63 |
| 4,725,836 | 2/1988 | Guidos | 340/825.59 |
| 4,972,432 | 11/1990 | Wilson et al. | 375/7 |
| 5,590,369 | 12/1996 | Burgess et al. | 395/800 |

*Primary Examiner*—Jason Chan
*Assistant Examiner*—Jean B. Corrielus
*Attorney, Agent, or Firm*—Donald C. Kordich; Lalita P. Williams

[57] ABSTRACT

A data-transmission system (100) including a master device (101) and at least one slave device (105) communicates messages having an address (1503, 1505) and data (1100) from the slave device (105) to the master device (101). The address (1503, 1505) is communicated synchronously and the data (1100) is communicated asynchronously. Furthermore, the address (1503, 1505) determines the control information and timing signal transmitted by the master device (101) to the slave devices (105-N).

24 Claims, 9 Drawing Sheets

METHOD OF AND APPARATUS FOR COMMUNICATING MESSAGES

FIELD OF THE INVENTION

The present invention relates generally to data-transmission systems. More particularly, the present invention relates to a method of and apparatus for communicating messages.

BACKGROUND OF THE INVENTION

Certain data-transmission systems for synchronously and asynchronously communicating data are known. For example, U.S. Pat. No. 4,369,516 entitled Self-Clocking Data Transmission System issued Jan. 18, 1983 to John P. Byrns and assigned to the assignee of the present invention describes a data-transmission system. In this data-transmission system, three signal lines--constituting a bus--couple a data transmitter with data receivers.

The data transmitter transmits data signals to the data receivers on two of the signal lines, called "true data" (TD) and "complement data" (CD). Furthermore, the data transmitter provides the clocking signal necessary for synchronous-data communication on these two signal lines.

The Byrns patent also describes data receivers transmitting return-data signals to the data transmitter on the return-data signal line, called "return data" (RD). The data receivers transmit the return-data signals in synchronism with the clocking signal. If a number of data receivers are connected to RD, the data transmitter selectively addresses the particular data receiver that is to transmit a return-data signal.

The Byrns patent further describes that any data receiver can alert the data transmitter that a return-data signal is available by putting an interrupt signal on RD. A data receiver may put the interrupt signal on RD at any time except during the time interval that a selected data receiver is transmitting a return-data signal. But, because the data transmitter has no way of telling which data receiver generated the interrupt signal, the data transmitter must poll all data receivers after receiving the interrupt signal to determine which data transmitter sent the interrupt signal.

Since the aforementioned early self-clocking synchronous-data-transmission system was developed, new applications for mobile- or portable-radiotelephone systems have evolved. For example, several handsets and peripherals are used along with the usual single-user handset having the keyboard and display adapter. Examples of such peripherals include auto-dialers and hands-free handset controllers. There is no provision in the Byrns patent, however, for bus contention among multiple handsets or peripherals that attempt to simultaneously transmit data on RD.

U.S. Pat. No. 4,654,655 entitled Multi-User Serial Data Bus issued Mar. 31, 1987 to Joseph L. Kowalski and assigned to the assignee of the present invention describes another self-clocking synchronous-data-transmission system. This patent describes a system having a bus controller that provides clocking and control information to a plurality of handsets or peripheral devices; the bus controller, handsets, and peripheral devices being interconnected by a bus having the three lines TD, CD, and RD.

In particular, the Kowalski patent describes an arbitration scheme to eliminate bus contention if several units simultaneously request service of the bus. Each device using the bus is assigned a four-bit address that also corresponds to a predetermined priority for that device. The priority assignments are used to determine which device will get service on the bus if several handsets or peripheral devices request service simultaneously.

If two devices request service simultaneously, each simultaneously places their particular address on RD in response to clocking information placed on TD and CD by the bus controller. Each device reads the signal on RD to determine if a higher priority unit is on the bus. When a lower priority unit senses a higher priority device on the bus, the lower priority device will enter a wait state until the higher priority device relinquishes control of the bus. Thus, only the highest priority device will remain on the bus.

In contrast to the two aforementioned self-clocking synchronous-data-transmission systems, asynchronous-data-transmission systems are known. For example, the MC68HC11A8 microprocessor supplied by Motorola, Inc. utilizes a serial communications interface (SCI). Using the SCI, the microprocessor can asynchronously communicate with other devices. HMOS Single Chip Microcomputer Data Book, order number ADI1207R1, 1987, pp. 5-1 to 5-5, further describes the MC68HC11A8 serial communications interface.

Compared to the aforementioned self-clocking synchronous-data-transmission systems as implemented in some mobile- or portable-radiotelephone systems, asynchronous-data-transmission systems can offer higher rates of data transfer. When devices in a mobile- or portable-radiotelephone system transfer a large amount of data, the higher transmission rate of the asynchronous-data-transmission system provides an advantage over the lower transmission rate of the synchronous-data-transmission system. To realize the features of both types of data transmission without retrofitting equipment already in service, a method of and apparatus for multiplexing both synchronous- and asynchronous-data transmission on the existing three-line bus is necessary.

U.S. Pat. No. 4,972,432 entitled Multiplexed Synchronous/Asynchronous Data Bus issued Nov. 20, 1990 to Gregory P. Wilson et al. and assigned to the assignee of the present invention describes a method of and bus for multiplexing synchronous- and asynchronous-data transmission. As described in this patent, on the one hand, the three-line bus in the self-clocking synchronous-transmission mode provides reliable transfer of data at a relatively low-data-throughput rate. On the other hand, the three-line bus in the asynchronous-transmission mode transfers data at a significantly higher data rate. For example, the three-line bus in the synchronous-transmission mode provides reliable transfer of data at approximately 500 bits-per-second; in contrast, the three-line bus in the asynchronous-transmission mode transfers data at approximately 19,200 bits-per-second.

Multiplexing both synchronous- and asynchronous-data transmission on the three-line bus as described in the Wilson et al. patent is suitable for some mobile- or portable-radiotelephone systems, for example, a portable radiotelephone coupled to a vehicle-mounted converter. Such a method of and bus for multiplexing synchronous and asynchronous data, however, is not suitable for all mobile- or portable-radiotelephone systems. For example, if multiple asynchronous devices are connected to the bus, the known method of and bus for multiplexing both synchronous and asynchronous data does not provide bus contention among the multiple asynchronous devices when they simultaneously request service of the bus. Thus, as practiced, only one vehicle-mounted converter is used on the bus. Furthermore, the vehicle-mounted converter (when in the slave mode) can not initiate a communication, and thus the portable radiotelephone must periodically poll the vehicle-mounted converter to determine if the asynchronous device has a message to send.

A need therefore exists for a method and apparatus that allows synchronously and asynchronously communicating devices to initiate transmissions on the bus, provides bus contention among multiple synchronously and asynchronously communicating devices, and retains backward compatibility with existing data-transmission systems and devices using the three-line bus.

DETAILED DESCRIPTION OF THE PREFERRED EMBODIMENTS

Figure 1:
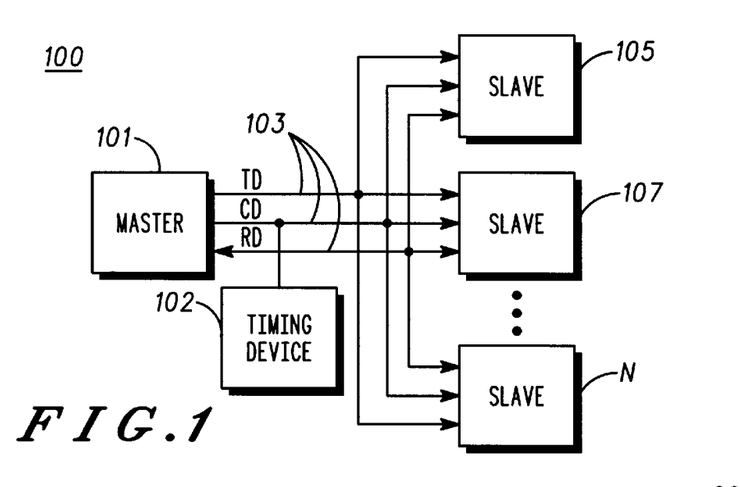
FIG. 1 is a simplified block diagram of a generalized data-transmission system that can employ the present invention.

FIG. 1 illustrates an exemplary embodiment of a generalized data-transmission system 100 that can employ the present invention. A bus 103 comprises three signal lines, labeled TD (true data), CD (complement data), and RD (return data), providing a common connection for a master device 101 and a plurality of slave devices 105-N. In particular, master device 101 and slave devices 105-N have a common TD connection, a common CD connection, and a common RD connection.

Bus 103 can be of any suitable medium for transmitting signals, for example, an electrically conductive material for conducting electrically induced signals, fiber-optic material for transmitting light-induced signals, or, for wireless transmission of data, three separate channels of the airwaves.

Slave devices 105-N are capable of synchronously or asynchronously (or both) generating and receiving signals. Each slave device is capable of generating a first signal that is applied to RD, and receiving a second signal applied to TD, a third signal applied to CD, and fourth signal applied to RD.

Master device 101 is capable of synchronously and asynchronously generating and receiving signals. Correspondingly, master device 101 is capable of receiving the first signal and generating the second, third, and fourth signals.

Using their respective signals, master device 101 and slave devices 105-N are capable of synchronously and asynchronously communicating messages having a digital format (i.e., messages represented by consecutive bits of first and second binary states) by generating and receiving digital signals having first and second binary states representative of the bits of the digitally formatted messages. The messages have first and second portions wherein an address identifying the slave device is contained in the first portion and data is contained in the second portion.

In addition to transmitting messages, master device 101 and slave devices 105-N can transmit control signals or predetermined control information by generating the first and second binary states of their respective signal. The technique for generating first and second binary states according to control information and bits of a message is readily understood from the known art.

For synchronous communication, a device for timing the communication of signals is necessary. For example, in one embodiment according to the present invention, master device 101 generates a clocking signal for timing the communication on the data-transmission system. Alternatively, a timing device 102, as shown in FIG. 1, apart from master device 101 or slave devices 105-N can provide the timing signal, or each device can have include means for timing the communication of signals.

The present invention provides four possible modes of data communication. At one level, either master device 101 or any slave device 105-N can initiate a data communication; and, at another level, the data can be communicated either synchronously or asynchronously. Each of these four modes of communication (master-initiated synchronous, slave-initiated synchronous, master-initiated asynchronous, and slave-initiated asynchronous) has their own protocol and message format. Accordingly, the four modes of communication are separately described below.

Master-initiated synchronous-data communication

Figure 2:
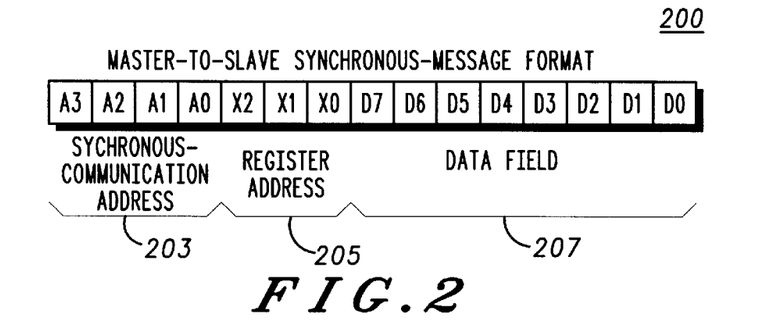
FIG. 2 illustrates the format of a master-to-slave synchronous message, according to one embodiment of the present invention.

Master device 101 can initiate a synchronous-data communication with, and synchronously transmit data to, any of slave devices 105-N. As shown in FIG. 2, a master-to-slave synchronous message 200 has fifteen bits (B14-B0) arranged in a predetermined message format. A synchronous-communication-address field 203, which is the first-four bits (A3-A0), contains an address of the slave device that master-to-slave synchronous message 200 is intended for. A data field 207, which is the last-eight bits (D7-D0), contains data of master-to-slave synchronous message 200. Finally, a register-address field 205, which is the remaining three bits (X2-X0), contains the address of the intended slave device's register that receives the data. Other message formats are possible, however, only the message format of one embodiment is described here.

The address contained in synchronous-communication-address field 203 identifies the slave device to receive the data and its priority relative to other slave devices. One such address-assignment-and-priority scheme is shown in the following table. In this scheme, a certain group of slave devices with the highest priority has the lowest-value address, and, conversely, the slave device with the lowest priority has the highest-value address.

TABLE

| Synchronous-communication address | Slave device type |
| --- | --- |
| 0000 | all asynchronously communicating slaves |
| 0001 | highest-priority synchronously communicating slave |
| • | • |
| • | • |
| • | • |
| 1 1 1 1 | lowest-priority synchronously communicating slave |

This address-assignment-and-priority scheme assigns lowest-value address "0000" of the highest priority to all asynchronously communicating slave devices. Further, a unique address is assigned to all synchronously communicating slave devices based on a predetermined priority among synchronously communicating slave devices. Other address-assignment-and-priority schemes are possible, for example, all synchronously communicating slave devices can be assigned lowest-value address "0000" of the highest priority.

Figure 3:
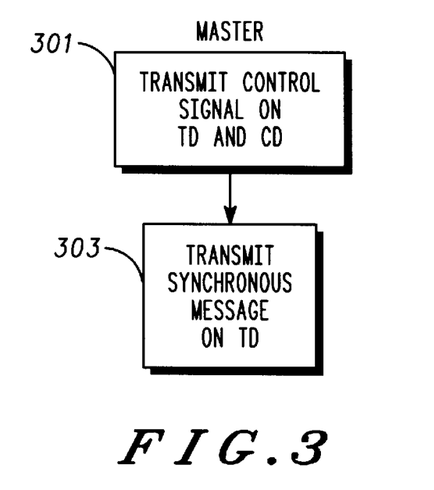
FIG. 3 illustrates a flow diagram of the steps performed by the master during a typical master-initiated synchronous-data communication, according to one embodiment of the present invention.

Referring to FIG. 3, which illustrates a flow diagram of the steps performed by the master during a typical master-initiated synchronous-data communication according to one embodiment of the present invention, master device 101 first uses TD and CD to transmit a control signal that informs slave devices 105-N to prepare themselves for the master-initiated communication (step 301). Then master device 101 uses TD to send master-to-slave synchronous message 200 (step 303).

Figure 4:
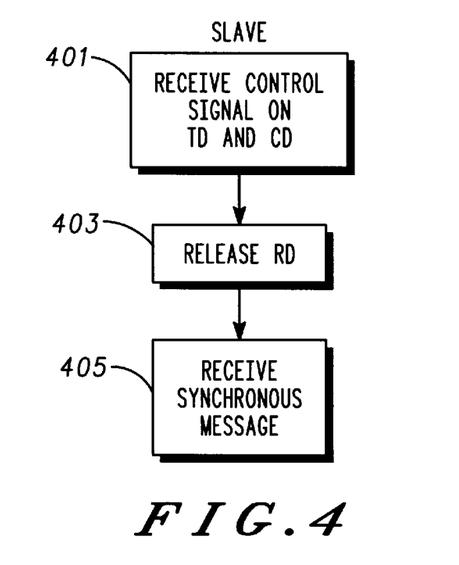
FIG. 4 illustrates a flow diagram of the steps performed by the slave device during the typical master-initiated synchronous-data communication, according to one embodiment of the present invention.

Referring to FIG. 4, which illustrates a flow diagram of the steps performed by the slave device during the typical master-initiated synchronous-data communication according to one embodiment of the present invention, correspondingly, slave devices 105-N initially receive the transmitted control signal on TD and CD (step 401). In response, if necessary, any slave devices communicating on RD release RD (step 403). The slave devices then receive transmitted master-to-slave synchronous message 200 on TD (step 405). Slave devices 105-N use a clocking signal to time their reading of master-to-slave synchronous message 200 on TD.

Figure 5:
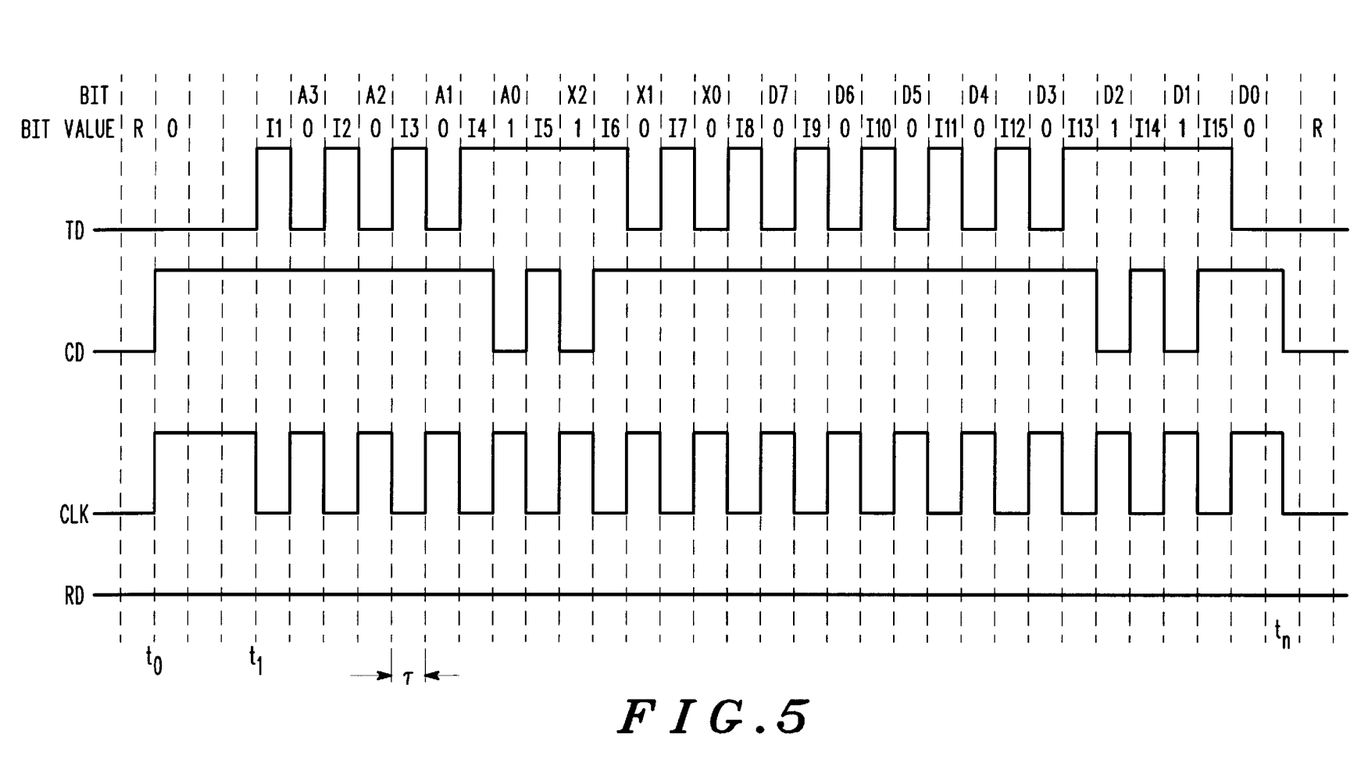
FIG. 5 illustrates a timing diagram showing the relationship of signals on the bus during the typical master-initiated synchronous-data communication, according to one embodiment of the present invention.

The protocol of the master-initiated synchronous-data communication can be further understood with reference to FIG. 5, which illustrates a timing diagram showing the relationship of signals on bus 103 during the typical master-initiated synchronous-data communication. In one embodiment, the binary states of the signals are represented by a logic zero having a substantially 0-volt value and a logic one having a substantially 5-volt value. Alternatively, the binary states can be assigned other voltage values.

When no communication is occurring on data-transmission system 100, bus 103 is not in use, thus TD and CD assume logic zero and RD assumes a logic one. Other combinations for an at-rest bus are possible, for example, TD and CD can assume logic one and RD a logic zero. To initiate a synchronous-data communication, at $t_0$ master device 101 generates a control signal comprising, for example, a logic one on CD while holding TD at a logic zero. Alternatively, the control signal can be a logic one on TD while holding CD at a logic zero. This control signal on TD and CD alerts the slave devices of the beginning of the master-initiated communication.

In this typical master-initiated synchronous communication, no communication was occurring on data-transmission system 100 before master device 101 initiated the communication. If a slave device was communicating at $t_0$, the master's communication would have priority over the slave device's communication, and the control signal would further alert the communicating slave device to end its communication. In this embodiment, to facilitate the communicating slave device's termination of the communication before the master transmits synchronous message 200, master device 101 holds the control signal on TD and CD for a predetermined period of time until all communicating slave devices release RD.

Master device 101 then generates binary states of the first signal on TD representative of to master-to-slave synchronous message 200 having a fifteen-bit message of "0001 100 0000 0110". Each bit A3-A0, X2-X0, and D7-D0 appear in the time slots as marked. In one embodiment, the time slots are of an equal duration τ of one millisecond. Other durations are possible, and the durations of the time slots need not be equal.

The initial control signal can be considered a sixteenth bit of the master-to-slave synchronous message 200, and is sometimes referred to as a READ/WRITE (R/W) bit.

Master device 101 also generates a second signal on CD while generating the first signal on TD. The first signal on TD in combination with the second signal on CD provide the clocking signal (CLk) to slave devices 105-N. That is, each change in binary state on TD and CD corresponds to a change in the binary state of the clocking signal. Slave devices 105-N use the clocking signal to time their reading of the control signal and master-to-slave synchronous message 200 on TD, i.e., during the time slot that the control signal and each bit appears. For example, the slave device can use the rising edge of the clocking signal to time the reading of the binary state on TD following the rising edge.

After the transmission of the master-to-slave synchronous message 200, at $t_n$, TD and CD assume a logic zero state. Consequently, TD and CD assume their state before the synchronous-data communication.

Figure 6:
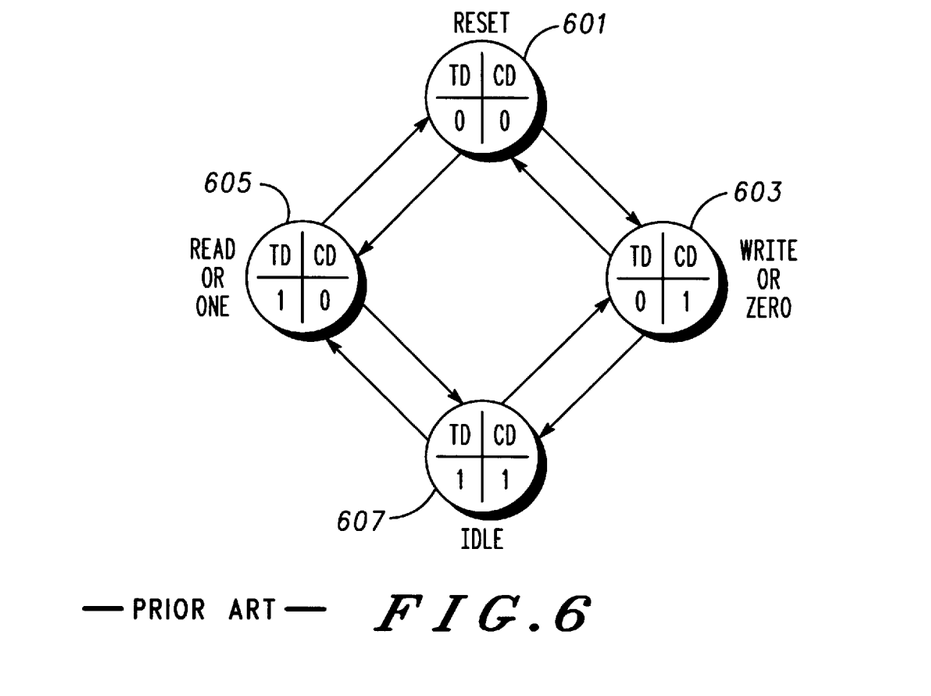
FIG. 6 is a state diagram illustrating the logical states of TD and CD, according to one embodiment of the present invention.

The generation of the control signal, message, and clocking signal can be further understood with reference to FIG. 6, which illustrates the possible logical states of TD and CD. Master device 101 provides the control signal, message, and clocking signal by utilizing the four two-bit binary states that can be assumed by TD and CD in combination. These states are referred to as a RESET 601, a WRITE 603 or ZERO 603, a READ 605 or ONE 605, and an IDLE 607. Although other combinations are possible, in one embodiment, TD and CD are each a logic zero for RESET 601; TD is a logic zero and CD is a logic one for WRITE 603; TD is a logic one and CD is a logic zero for READ 605; and TD and CD are each a logic one for IDLE 607. ZERO 603 and ONE 605 are collectively referred to as data states; and RESET 601, WRITE 603, and READ 605 are collectively referred to as control states. The term "complement data" derives from the fact that CD has a complement binary state to TD in the data states.

Master device 101 transits TD and CD between the states shown in FIG. 6 so that either TD or CD but not both are changing binary value during each transition. Transitions between RESET 601 and IDLE 607 and between ZERO 603 and ONE 605 are not allowed since they would require that the value of both TD and CD change simultaneously. This limiting of transitions between the binary states minimizes the effects of skewing and timing variations. Moreover, this scheme provides self-clocking and is independent of the transmitting frequency. That is, the time duration, τ, between each of the state transitions need not be the same and may vary dynamically thereby enabling the frequency of the message transmission to be selectable and with randomly varying time intervals between successive state transitions.

Again referring to FIG. 5, and using the shorthand notation of the binary states that TD and CD can assume, the protocol of a master-initiated synchronous-data communication can be succinctly described. Before $t_0$, TD and CD assume control state RESET 601. This state indicates to the slave devices that bus 103 is available for communication. When master device 101 initiates the communication at $t_0$, master device 101 transits TD and CD from control state RESET 601 to control state WRITE 603. This condition indicates to the slave devices that master device 101 is writing a message to bus 103, and, accordingly, the slave devices should release RD, read the message on TD, and not initiate any communication until TD and CD again assume RESET 601. Next, starting at $t_1$, for each bit of the message, master device 101 transits TD and CD to either data state ZERO 603 or data state ONE 605, depending on the bit value of master-to-slave synchronous message 200, while interleaving IDLE 607. If the message bit value is zero, the transition is made to ZERO 603; if the message bit value is one, the transition is made to ONE 605. Finally, at $t_n$ after the last message-bit value has been generated, TD and CD assume control state RESET 601, which indicates bus 103 is again available for communication.

This shorthand notation will be used hereafter to described the signals on TD and CD.

Slave-initiated synchronous-data communication

Figure 7:
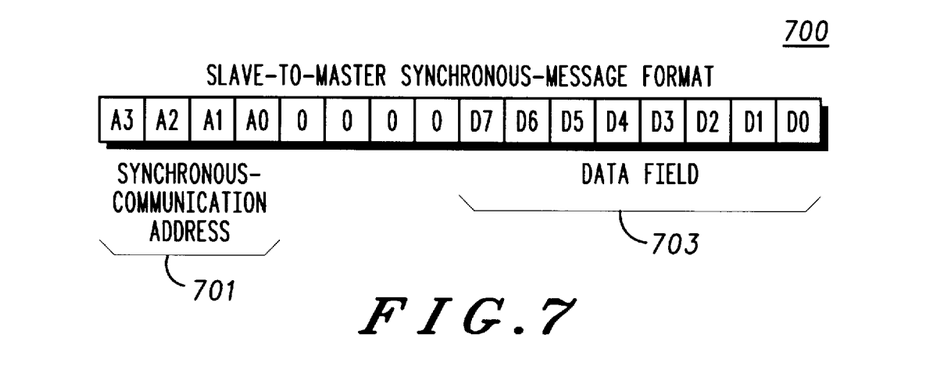
FIG. 7 illustrates the format of a slave-to-master synchronous message, according to preferred embodiment of the present invention.

Any of slave devices 105-N can initiate a synchronous-data communication with, and synchronously transmit data to, master device 101. As shown in FIG. 7, in one embodiment, a slave-to-master synchronous message 700 has sixteen bits arranged in a predetermined format. A synchronous-communication-address field 701, which is the first-four bits (A3-A0), contains the synchronous-communication address of the slave device initiating the communication. The next-four bits are set to "0000". A data field 703, which is the last-eight bits (D7-D0), contains data. Other message formats are possible, for example, data field 703 can precede the bits "0000".

The address contained in synchronous-communication-address field 701 not only identifies the slave device initiating the synchronous-data communication, but also determines the priority of the slave devices when more than one slave device substantially simultaneously initiates a synchronous communication. As described earlier, the slave device with the highest priority has the lowest-value address, and, conversely, the slave device with the lowest priority has the highest-value address.

Figure 8:
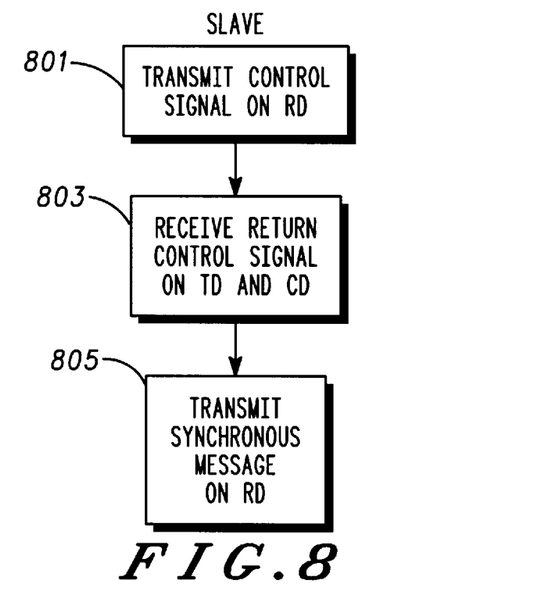
FIG. 8 illustrates a flow diagram of the steps performed by the slave device during a typical slave-initiated synchronous-data communication, according to one embodiment of the present invention.

Referring to FIG. 8, which illustrates the steps performed by any slave device 105-N during a typical slave-initiated synchronous-data communication according to one embodiment of the present invention, any of slave devices 105-N first uses RD to transmit a control signal that informs master device 101 to prepare for the slave-initiated communication (step 801). The slave devices then receive a return-control signal on TD and CD (step 803), and the slave devices initiating the request use RD to send their respective slave-to-master synchronous message 700 (step 805).

Figure 9:
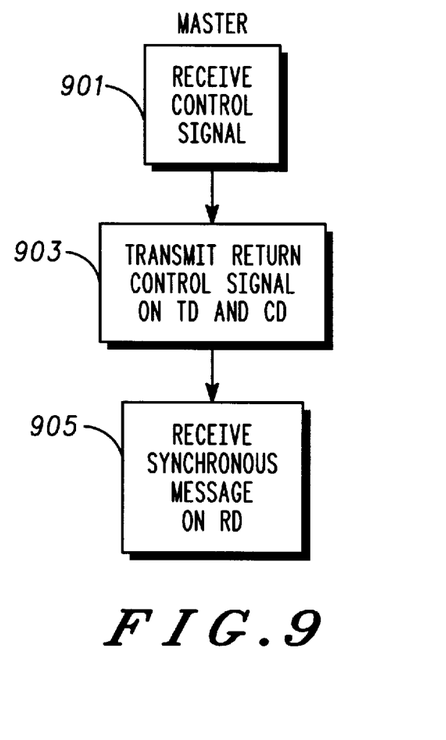
FIG. 9 illustrates a flow diagram of the steps performed by the master during the typical slave-initiated synchronous-data communication, according to one embodiment of the present invention.

Referring to FIG. 9, which illustrates the steps performed by master device 101 during the typical slave-initiated synchronous-data communication, correspondingly, master device 101 initially receives the transmitted control signal on RD (step 901) and responds by transmitting a return-control signal on TD and CD (step 903). Afterwards, master device 101 receives the respective slave-to-master synchronous message 700 on RD.

Figure 10:
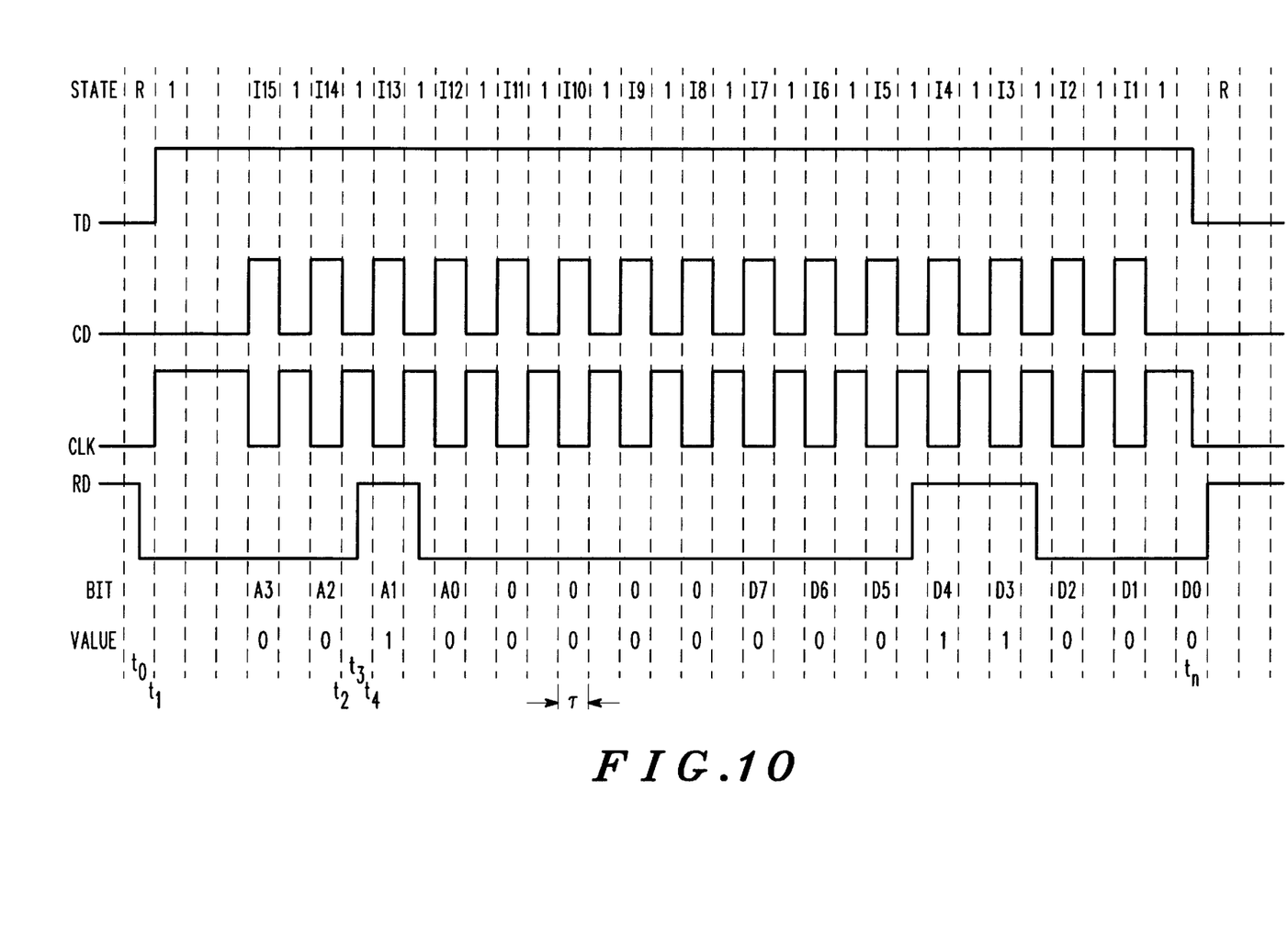
FIG. 10 illustrates a timing diagram showing the relationship of signals on the bus during the typical slave-initiated synchronous-data communication, according to one embodiment of the present invention.

The protocol of the slave-initiated synchronous-data communication can be further understood with reference to FIG. 10, which illustrates a timing diagram showing the relationship of signals on bus 103 during the typical slave-initiated synchronous-data communication.

When no communication is occurring on data-transmission system 100, bus 103 is not in use, TD and CD assume RESET 601 and RD assumes logic one. To initiate a synchronous-data communication, at $t_0$ a slave device transmits a control signal on RD, for example, a logic zero on RD. Alternatively, RD can assume logic zero when not in use and a slave device transmits a control signal on RD by generating a logic one. The control signal alerts master device 101 of the beginning of the slave-initiated communication.

Master device 101 receives the logic zero on RD and responds at $t_1$ with a return-control signal by changing the state of TD and CD from RESET 601 to READ 605. This READ 605 indicates to all the slave devices that master device 101 is reading a message on bus 103 (and that RD is in use), and, accordingly, all slave devices should not initiate any communication until TD and CD assume RESET 601.

Further, the control state READ 605 appearing on TD and CD informs all slave devices to ignore what appears to be a master-to-slave synchronous message 200 received on TD.

The slave device initiating the communication receives the return-control signal on TD and CD and prepares to transmit the first bit of the message on RD.

In this example, the slave device generates binary states of the third signal on RD representative of slave-to-master synchronous message 700 having a sixteen-bit message of "0010 0000 0001 1000". Each bit A3-A0, "0000", and D7-D0 appear in the time slots as marked.

In one embodiment, master device 101 provides the clocking signal by sending out interleaved IDLE 607 and READ 605 on TD and CD while TD remains at a logic one. In response to the clocking signal, the slave device applies the message bits to RD by changing the state of RD any time TD and CD are at READ 605. For example, a slave device can use the rising edge of the clock at $t_2$ to time the applying of a bit at $t_3$.

The slave device holds a bit on RD throughout IDLE 607. During IDLE 607, master device 101 reads the written bit. Master device 101 can time its reading of the bit from the falling edge of the clocking signal.

To compensate for the situation where more than one slave device substantially simultaneously initiates a request, all slave devices applying a message to RD read at least the first-four bits of the message, which represents the synchronous-communication address of the slave device, and compares the read bit with the bit the slave device is sending. If a slave device detects a conflict between the two bits, the slave device detecting the conflict stops sending its message and releases RD. Thus, because of the address-assignment-and-priority scheme, only synchronously communicating slave devices will be on bus 103 after the bits of synchronous-communication-address field 701 have been written and read. The slave device detecting the conflict and releasing RD can request service again when TD and RD assume RESET 601 after the end of the current communication.

For fault tolerance protection, in one embodiment, the slave device remaining on bus 103 checks all sixteen bits. To allow reading of the last bit, the last bit stays on RD for a predetermined period after TD and CD assume RESET 601 at $t_n$. In one embodiment, the predetermined time is 50 to 500 microseconds. This hold is necessary because the slave device does not read the last bit until the transition from the final READ 605 to RESET 601, i.e., the last falling edge of the clocking signal.

For added protection, if a slave device detects RESET 601 on TD and RD before the end of the communication, which would indicate an abnormal condition because RESET 601 should not occur until end of the slave-initiated synchronous-data communication, the slave device aborts its transmission and can resend its message afterwards.

Master-initiated asynchronous-data communication

Figure 11:
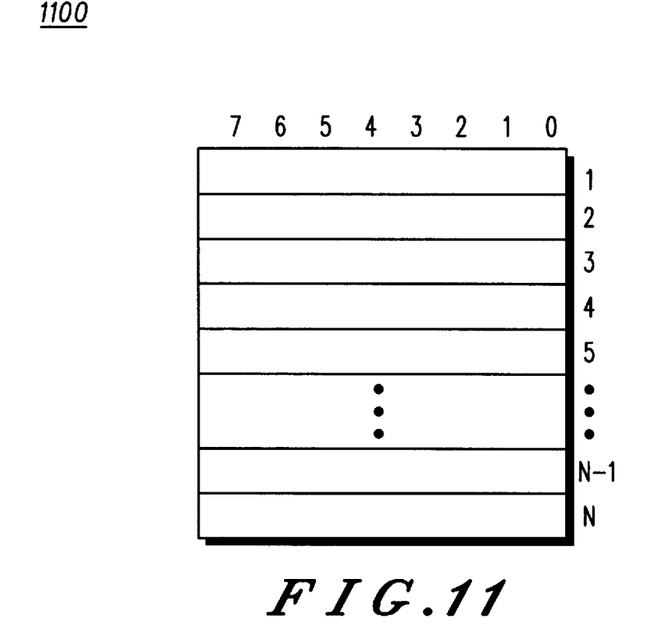
FIG. 11 illustrates the format of a master-to-slave asynchronous message, according to one embodiment of the present invention.

Master device 101 can initiate an asynchronous-data communication with, and asynchronously transmit data to, any of slave devices 105-N. Referring to FIG. 11, in one embodiment, a master-to-slave asynchronous message 1100 is arranged in a predetermined format. Other message formats are possible.

In one embodiment, the asynchronous message follows the Serial Communication Interface (SCI) for the MC68HC11 family of eight-bit microprocessors supplied by Motorola, Inc. (or their equivalents). The asynchronous message is characterized by a standard NRZ format and meets the following criteria:

1) an idle line is brought to a logic one state prior to transmission/reception of a character;

2) a start bit (logic zero) is used to indicate the start of a frame;

3) the data is transmitted and received least significant bit first;

4) a stop bit (logic one) is used to indicate the end of a frame (a frame consists of a start bit, a character of eight- or nine-data bits, and a stop bit); and 5) a break is defined as the transmission or reception of a low (logic zero) for at least one complete frame time.

The asynchronous message can have 1 through N bytes, each byte consisting of eight bits. The bytes are transmitted in ascending order, starting with bit-number seven. (The start and stop bits that are appended to each byte during transmission are not shown in FIG. 11.)

Figure 12:
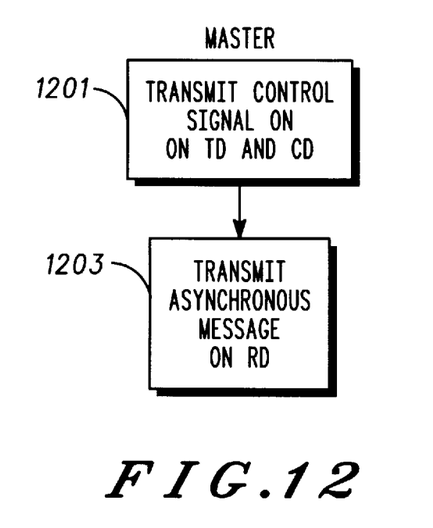
FIG. 12 illustrates a flow diagram of the steps performed by the master during a typical master-initiated asynchronous-data communication, according to one embodiment of the present invention.

Referring to FIG. 12, which illustrates a flow diagram of the steps performed by the master during a typical master-initiated asynchronous-data communication according to one embodiment of the present invention, master device 101 first uses TD and CD to transmit a control signal that informs slave devices 105-N to prepare themselves for the master-initiated communication (step 1201). Then master device 101 uses RD to send master-to-slave asynchronous message 1100 (step 1203).

Figure 13:
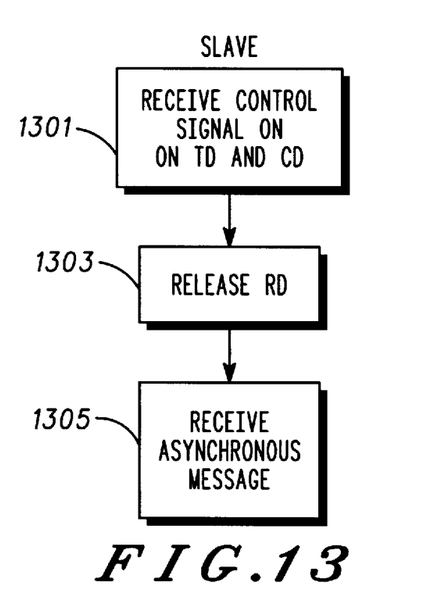
FIG. 13 illustrates a flow diagram of the steps performed by the slave device during the typical master-initiated asynchronous-data communication, according to one embodiment of the present invention.

Referring to FIG. 13, which illustrates a flow diagram of the steps performed by the slave device during the typical master-initiated asynchronous-data communication, slave devices 105-N initially receive the control signal on TD and CD (step 1301). In response, if necessary, any slave devices communicating on RD release RD (step 1303). The slave devices then receive master-to-slave asynchronous message 1100 on RD (step 1305). Any slave device that released RD can subsequently request service on bus 103 and resend their message after TD and CD assume RESET 601.

Figure 14:
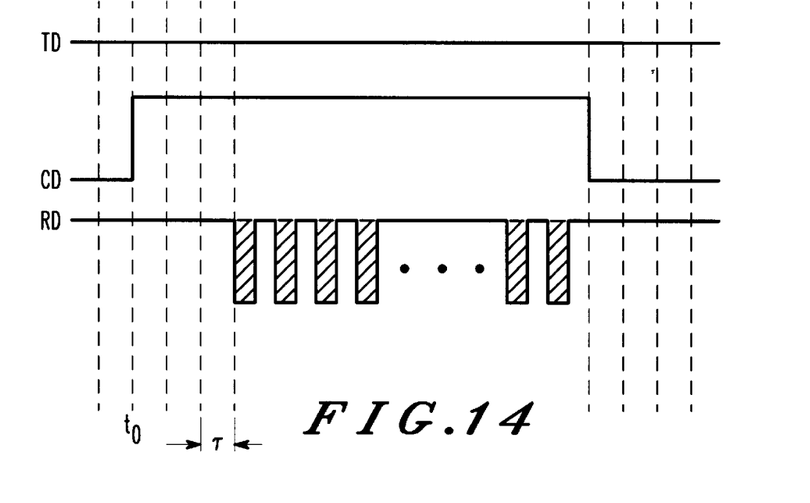
FIG. 14 illustrates a timing diagram showing the relationship of signals on the bus during the typical master-initiated asynchronous-data communication, according to one embodiment of the present invention.

The protocol of the master-initiated asynchronous-data communication can be further understood with reference to FIG. 14, which illustrates a timing diagram showing the relationship of signals on bus 103 during the typical master-initiated asynchronous-data communication.

To initiate an asynchronous-data communication, at $t_0$ master device 101 transmits a control signal, for example, of WRITE 603 by changing CD from logic zero to logic one while holding TD at logic zero. This control signal alerts the slave devices of the beginning of the master-initiated communication.

In one embodiment, master device 101 holds WRITE 603 on TD and CD for at least $3\pi$ to allow time for all the slave devices to release RD. Keeping TD and CD at WRITE 603 ensures that all slave devices stay off RD until the master-initiated asynchronous-data communication is complete.

Following the last bit of the asynchronous-data transmission, TD and CD assume RESET 601. RESET 601 indicates to the slave devices that master device 101 has completed transmitting the asynchronous message.

Slave-initiated asynchronous-data communication

Any of slave devices 105-N can initiate an asynchronous-data communication with, and asynchronously transmit data to, master device 101. This is an advantage provided by the present invention over known data-transmission systems having a three-line bus, which do not provide slave-initiated asynchronous-data communication. Known systems require that the master first enter an asynchronous data communication mode and then asynchronously poll each slave device to determine whether they have data to transmit asynchronously. Consequently, the present invention reduces the overhead of polling by allowing slave devices to directly initiate the asynchronous communication.

Figure 15:
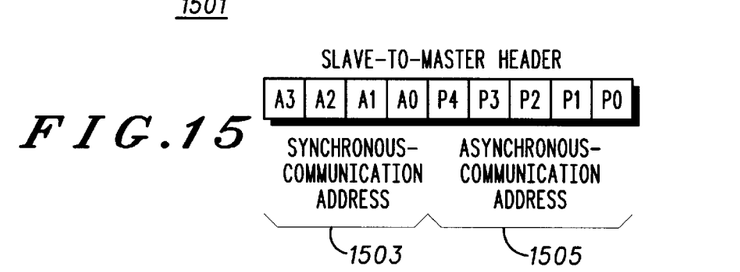
FIG. 15 illustrates the format of a slave-to-master header portion of a slave-to-master asynchronous message, according to one embodiment of the present invention.

As shown in FIG. 15, a slave-to-master asynchronous message is arranged in a predetermined message format having two distinct portions. The first portion is a slave-to-master header 1501, which is synchronously transmitted similarly to slave-to-master synchronous message 700; and the second portion is an asynchronous message, which is transmitted asynchronously.

Slave-to-master header 1501 has nine bits. A synchronous-communication-address field 1503, which includes the first-four bits (A3-A0), contains the synchronous-communication address of the slave device initiating the asynchronous-data communication. As described earlier, in one embodiment, the asynchronously communicating slave devices have a synchronous-communication address contained in synchronous-communication-address field 1503 of "0000". Accordingly, any asynchronously communicating slave devices will have priority over any synchronously communicating slave devices that substantially simultaneously initiate a communication. This is an advantage provided by the present invention because known data-transmission systems having a three-line bus did not provide bus contention among asynchronously communicating slave devices and synchronously communicating slave devices.

An asynchronous-communication-address field 1505, which is the last-five bits (P4-P0) of slave-to-master header 1501, contains an asynchronous-communication address of the slave device initiating the asynchronous-data communication. The address-assignment-and-priority scheme assigns an unique address to each asynchronously communicating slave device with the slave device of the highest priority having the lowest-value address. This is an advantage provided by the present invention because known data-transmission systems having a three-line bus did not provide bus contention among asynchronously communicating slave devices.

The second portion of slave-to-master asynchronous message is the asynchronous message, which is referred to as an SCI message. The SCI message has the same format as master-to-slave asynchronous message 1100 described in the master-initiated asynchronous-data communication.

Figure 16:
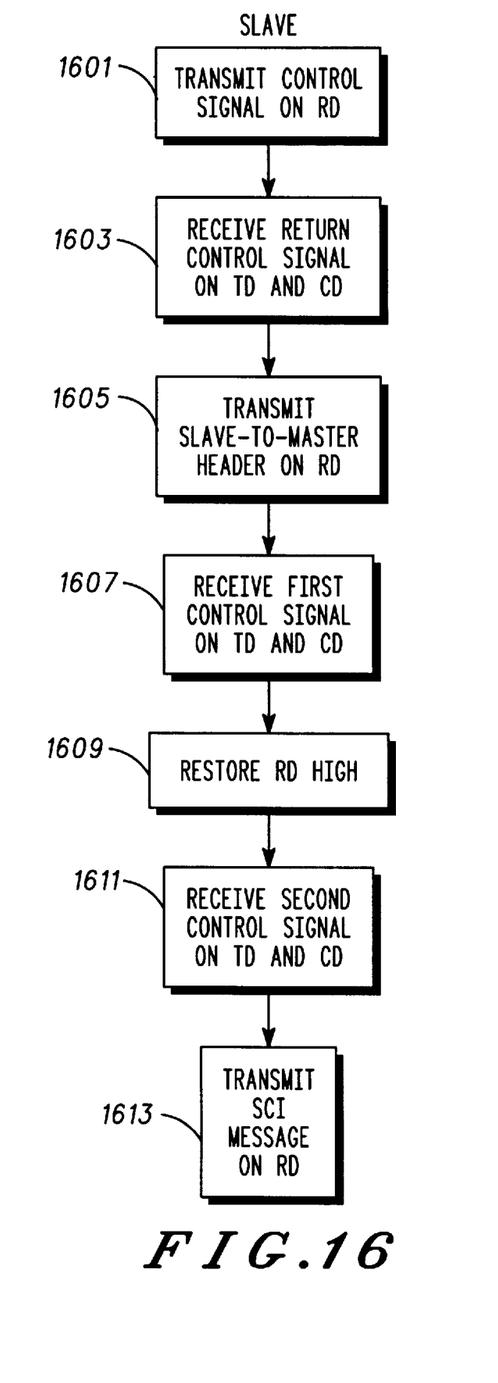
FIG. 16 illustrates a flow diagram of the steps performed by the slave device during a typical slave-initiated asynchronous-data communication, according to one embodiment of the present invention.

In general terms, the initial portion of a typical slave-initiated asynchronous-data communication is similar to the typical slave-initiated synchronous-data communication. Referring to FIG. 16, which illustrates the steps performed by any slave device 105-N during the typical slave-initiated synchronous-data communication according to one embodiment of the present invention, the slave device first uses RD to transmit a control signal that informs master device 101 to prepare for the slave-initiated communication (step 1601). The slave device then receives a return-control signal on TD and CD from master device 101 (step 1603) and, in response, uses RD to send the slave-to-master header 1501 (step 1605).

Upon completing the sending of slave-to-master header 1501, the slave device receives a first control signal on TD and CD from master device 101 (step 1607). In response, the slave device restores RD high (step 1609). The slave device then receives a second control signal on TD and CD (step 1611). In response, the communicating slave device transmits SCI message 1507 on RD (step 1613).

Figure 17:
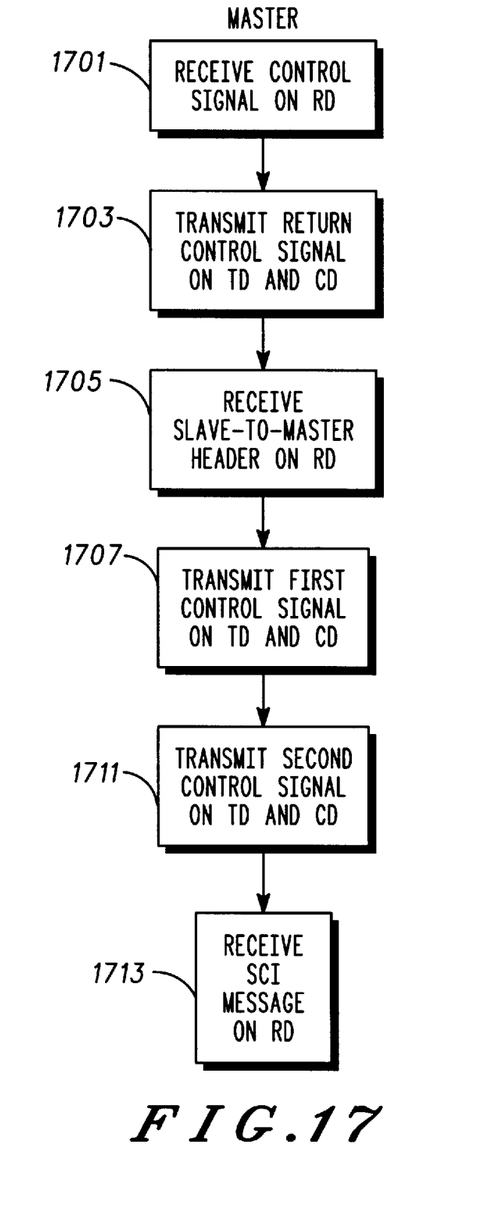
FIG. 17 illustrates a flow diagram of the steps performed by the master during the typical slave-initiated asynchronous-data communication, according to one embodiment of the present invention.

Referring to FIG. 17, which illustrates the steps performed by master device 101 during the typical slave-initiated asynchronous-data communication, correspondingly, master device 101 initially receives the transmitted control signal on RD (step 1701) and responds by transmitting the return-control signal on TD and CD (step 1703). Afterwards, master device 101 receives the slave-to-master header 1501 on RD.

After receiving slave-to-master header 1501, master device 101 transmits the first control signal on TD and CD from master device 101 (step 1707), and then transmits the second control signal on TD and CD (step 1711). Subsequently, master device 101 receives SCI message 1507 on RD (step 1713).

Figure 18:
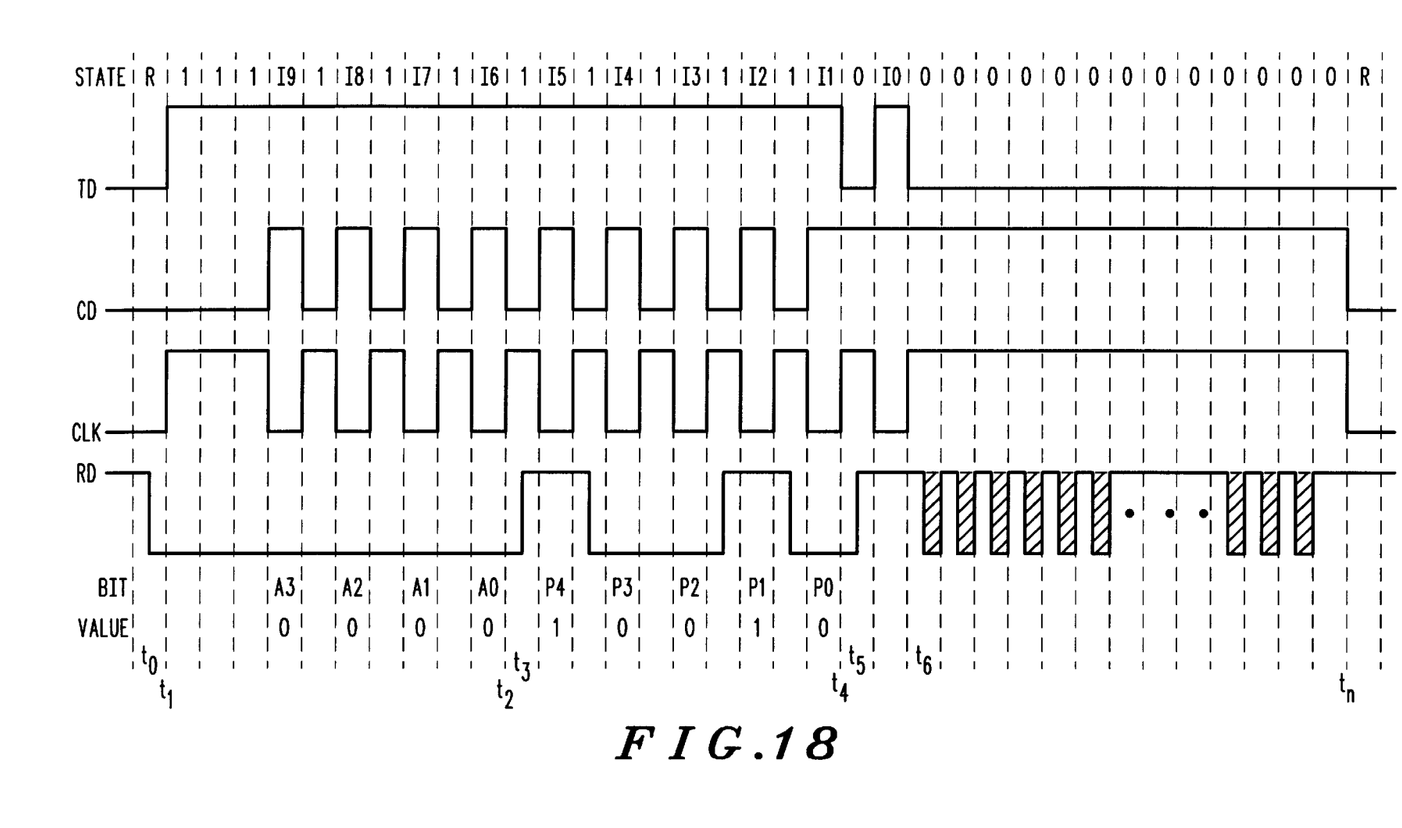
FIG. 18 illustrates a timing diagram showing the relationship of signals on the bus during a typical slave-initiated asynchronous-data communication, according to one embodiment of the present invention.

The protocol of the slave-initiated asynchronous-data communication can be further understood with reference to FIG. 18, which illustrates a timing diagram showing the relationship of signals on bus 103 during the typical slave-initiated asynchronous-data communication.

As in the slave-initiated synchronous-data communication, a slave device initiates the communication at to by transmitting a control signal, for example, by pulling RD to logic zero. Master device 101 senses the logic zero on RD and responds with a return-control signal at $t_1$ by changing TD and CD from control state RESET 601 to control state READ 605. This READ 605, as it does in the slave-initiated synchronous-data communication shown in FIG. 10, indicates to all the slave devices that master device 101 is reading a message on bus 103 and that RD is in use, and, accordingly, all slave devices should not initiate any new communication until TD and CD assume RESET 601. Further, the control state READ 605 appearing on TD and CD informs all slave devices to ignore the message received on TD and CD.

The slave device initiating the request senses READ 605 and prepares to transmit the first bit of the message on RD. In this example, a slave device generates binary states of the third signal on RD corresponding to slave-to-master header 1501 containing bits "0000 10010". Each bit A3-A0 and P4-P0 appear in the time slots as marked.

In the typical slave-initiated asynchronous-data communication according to one embodiment of the present invention, master device 101 provides the clocking signal by sending out interleaved IDLE 607 and READ 605 on TD and CD while TD remains at READ 605. In response to the clocking signal, the slave device begins applying the bits representing the message to RD by changing the state of RD any time TD and CD are at READ 605. For example, a slave device can use the rising edge of the clock at $t_2$ to time the applying of a bit at $t_3$.

The slave device holds a bit on RD throughout IDLE 607. During IDLE 607, master device 101 reads the written bit. Master device 101 can time its reading of the bit from the falling edge of the clocking signal.

To compensate for the situation where more than one slave device substantially simultaneously initiates a request, all slaves devices applying a message to RD read, if necessary, the first-nine bits of the message, which contains the unique address of the slave device, and compares the read bit with the bit the slave device is sending. If a slave device detects a conflict between the two bits, the slave device detecting the conflict stops sending its message and releases RD. Thus, because of the address-assignment-and-priority scheme, only asynchronously communicating slave devices will be on bus 103 after the bits of synchronous-communication-address field 1503 have been written and read, because asynchronously communicating slave devices have the highest-priority synchronous-communication address of "0000". Furthermore, only one asynchronously communicating slave device will be on bus 103 after the bits of asynchronous-communication-address field 505 have been written and read by the slave devices because of the unique asynchronous-communication address assignment. The slave device detecting the conflict and releasing RD can request service again when master device 101 sets TD and RD to RESET 601 after the end of the current communication.

Moreover, not only does the unique synchronous communication address of "0000" provide bus arbitration between asynchronously communicating slave devices and synchronously communicating slave devices, it also notifies master device 101 that the requesting slave device is transmitting slave-to-master asynchronous message so that master device 101 can execute the protocol for receiving slave-to-master asynchronous message rather than slave-to-master synchronous message 700. That is, rather than providing a clocking signal by sending out interleaved IDLE 607 and READ 605 for transmitting the fifteen-message bits of slave-to-master synchronous message 700 shown in FIG. 10, master device 101 instead sends out enough interleaved IDLE 607 and READ 605 for transmitting the nine-message bits of slave-to-master header 1501. Furthermore, the timing of the transmission of the control signal or information is altered to accommodate the nine-message bits.

To terminate the clocking signal for transmitting slave-to-master header 1501, at $t_4$ master device 101 places a control state WRITE 603 on TD and CD. The transmitting slave device detects WRITE 603 and, at $t_5$, completes transmission of slave-to-master header 1501, restores RD to high, and prepares for transmission of SCI message 1507 to master device 101 via RD.

Furthermore, after placing the control state WRITE 603 on TD and CD, master device 101 then places IDLE 607 on TD and CD and prepares to receive asynchronous-data. Master device 101 then places another control state WRITE 603 on TD and CD and holds this state throughout the transmission of SCI message 1507. The transmitting slave device detects WRITE 603 and, at $t_6$, begins transmitting SCI message 1507. Master device 101 receives SCI message 1507 on RD. Moreover, this second WRITE 603 (as the control state WRITE 603 does in the master-initiated asynchronous-data communication shown in FIG. 14) informs other slave devices that bus 103 is in use and prevents other slave devices from initiating a communication.

Following the last bit of SCI message 1507 on RD, at $t_n$ TD and CD assume control state RESET 601. RESET 601 indicates to the slave devices that the transmitting slave device has completed the asynchronous-data communication.

Radiotelephone systems and devices can advantageously employ the present invention. Although the invention is particularly described with radiotelephone systems and devices as one embodiment, the invention may just as well be employed in other systems and devices that synchronously and asynchronously transmit data.

Figure 19:
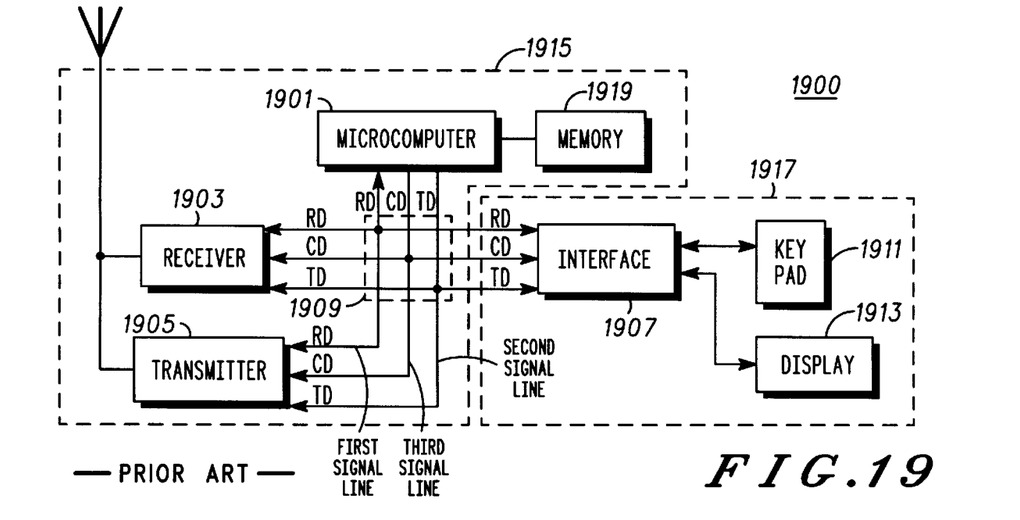
FIG. 19 is a simplified block diagram of a radiotelephone system that can employ the present invention.

FIG. 19 illustrates a simplified block diagram of a radiotelephone system 1900 that can employ the present invention. Bus 1909 (the three signal lines of bus 1909 are not shown) provides a common connection for a microcomputer 1901, a receiver circuit 1903, a transmitter circuit 1905, and an interface circuit 1907. Associated with microcomputer 1901 is a memory circuit 1919. A keypad circuit 1911 for entering information by a user, and a display circuit 1913 for displaying information to the user, are coupled to interface circuit 1907.

Microprocessor 1901 includes means, coupled to TD, for synchronously and asynchronously transmitting messages; means, coupled to TD, for transmitting control signals or predetermined control information; means, coupled to CD, for transmitting a timing signal and further predetermined control information; means, coupled to the RD, for synchronously receiving the bits of the pre-assigned address; means, coupled to RD, for synchronously and asynchronously receiving the bits of data; and means, coupled to RD, for receiving control signals. The technique for programming a microcomputer to perform these functions is readily understood from the known art.

Interface circuit 1907 can include circuitry for interfacing keypad circuit 1911 and display circuit 1913 to bus 1903. In addition, interface circuit 1907 can include a microcomputer or means, coupled to RD, for synchronously transmitting the bits of the pre-assigned address; means, coupled to RD, for synchronously or asynchronously (or both) transmitting the bits of data; means, coupled to RD, for transmitting control signals; means, coupled to the TD, for receiving messages and control signals or predetermined control information; and means, coupled to CD, for receiving a timing signal and further control signals or predetermined control information. Alternatively, keypad circuit 1911 and display circuit 1913 can each include a microcomputer for performing the aforementioned functions rather than interface circuit 1907.

Receiver circuit 1903, transmitter circuit 1905, and microcomputer 1901 can be physically grouped together as a transceiver unit 1915. Keypad circuit 1911, display circuit 1913, and interface circuit 1907 can be physically grouped together as a handset 1917. Handset 1917 may be physically separate from transceiver unit 1915, for example, in a mobile radiotelephone system; or handset 1917 and transceiver unit 1915 may be physically integrated, for example, in a handheld or pocket radiotelephone.

In the embodiment shown in FIG. 19, microcomputer 1901 corresponds to master device 101 shown in FIG. 1, and receiver circuit 1903, transmitter circuit 1905, and handset 1917 correspond to the slave devices shown in FIG. 1. Alternatively, transceiver unit 1915 corresponds to master device 101 and handset 1917 corresponds to the slave device. As used in the claims, the term "radiotelephone peripheral" denotes handsets, peripherals, or other synchronously and asynchronously communicating devices that can be coupled with bus 1903.

Thus, according to the present invention, unique systems, devices, methods, protocols, and message formats has been described that allows synchronously and asynchronously communicating slave devices to initiate transmissions on the bus and further provide bus contention among multiple synchronously or asynchronously (or both) communicating slave devices features not provided by the prior art. Furthermore, the unique systems, devices, methods, protocols, and message formats maintain backward compatibility with existing transmission systems having a three-line bus.

What is claimed is:

1. A method of transmitting a message by a slave device, the message having first and second portions wherein an address identifying the slave device is contained in the first portion and data is contained in the second portion, the first and second portions having a plurality of consecutive bits representative of the address and data, the slave device capable of generating a first signal having first and second binary states, the method comprising the steps of:

providing a timing signal;

in response to the timing signal, for each bit of the first portion, generating either the first or second binary state of the first signal representative of the bits of the first portion so that the address is synchronously transmitted; and for each bit of the second portion, generating either the first or second binary state of the first signal representative of the bits of the second portion so that the data is asynchronously transmitted.

2. The method of claim 1 further comprising the step of generating the first binary state of the first signal before generation of either the first or second binary state of the first signal representative of the bits of the first portion.

3. The method of claim 1, the slave device further capable of receiving at least a second signal having first and second binary states, the method further comprising the step of receiving the second binary state of the second signal before and during generation of either the first or second binary state of the first signal representative of the bits of the first portion.

4. The method of claim 1, the slave device further capable of receiving at least a second signal having first and second binary states, wherein providing a timing signal includes the sub-step of receiving the second binary state of the second signal for each bit of the first portion.

5. The method of claim 1, the slave device further capable of receiving at least a second signal having first and second binary states, the method further comprising the step of receiving the second binary state of the second signal before and during generation of either the first or second binary state of the first signal representative of the bits of the second portion.

6. A method of transmitting a message by a radiotelephone peripheral, the message having first and second portions wherein an address identifying the radiotelephone peripheral is contained in the first portion and data is contained in the second portion, the first and second portions having a plurality of consecutive bits representative of the address and data, the radiotelephone peripheral capable of generating a first signal and receiving at least a second signal, the first and second signals having first and second binary states, the method comprising the steps of:

generating the first binary state of the first signal;

receiving the second binary state of the second signal;

in response to generating the first binary state of the first signal, providing a timing signal;

in response to the timing signal, for each bit of the first portion, generating either the first or second binary state of the first signal representative of the bits of the first portion so that the address is synchronously transmitted; and for each bit of the second portion, generating either the first or second binary state of the first signal representative of the bits of the second portion so that the data is asynchronously transmitted.

7. The method of claim 6, the radiotelephone peripheral further capable of receiving a third signal having first and second binary states, wherein providing a timing signal includes the sub-step of receiving the second binary state of the third signal for each bit of the first portion.

8. The method of claim 6, the radiotelephone peripheral further capable of receiving a third signal having first and second binary states, the method further comprising the step of receiving the second binary state of the third signal before and during generation of either the first or second binary state of the first signal representative of the bits of the second portion.

9. A method of receiving a message by a master device, the message having first and second portions wherein an address identifying a slave device is contained in the first portion and data is contained in the second portion, the first and second portions having a plurality of consecutive bits representative of the address and data, the master device capable of receiving a first signal having first and second binary states, the method comprising the steps of:

providing a timing signal;

in response to the timing signal, for each bit of the first portion, receiving either the first or second binary state of the first signal representative of the bits of the first portion so that the address is synchronously received; and for each bit of the second portion, receiving either the first or second binary state of the first signal representative of the bits of the second portion so that the data is asynchronously received.

10. The method of claim 9 further comprising the step of receiving the first binary state of the first signal before reception of either the first or second binary state of the first signal representative of the bits of the first portion.

11. The method of claim 9, the master device further capable of generating at least a second signal having first and second binary states, the method further comprising the step of generating the second binary state of the second signal before and during reception of either the first or second binary state of the first signal representative of the bits of the first portion.

12. The method of claim 9, the master device further capable of generating at least a second signal having first and second binary states, wherein providing a timing signal includes the sub-step of generating the second binary state of the second signal for each bit of the first portion.

13. The method of claim 9, the master device further capable of generating at least a second signal having first and second binary states, the method further comprising the step of generating the second binary state of the second signal before and during reception of either the first or second binary state of the first signal representative of the bits of the second portion.

14. A method of receiving a message by a radiotelephone transceiver unit, the message having first and second portions wherein an address identifying a radiotelephone peripheral is contained in the first portion and data is contained in the second portion, the first and second portions having a plurality of consecutive bits representative of the address and data, the radiotelephone transceiver unit capable of receiving a first signal and generating at least a second signal, the first and second signals having first and second binary states, the method comprising the steps of:

receiving the first binary state of the first signal;

generating the second binary state of the second signal;

in response to receiving the first binary state of the first signal, providing a timing signal;

in response to the timing signal, for each bit of the first portion, receiving either the first or second binary state of the first signal representative of the bits of the first portion so that the address is synchronously received; and for each bit of the second portion, receiving either the first or second binary state of the first signal representative of the bits of the second portion so that the data is asynchronously received.

15. The method of claim 14, the radiotelephone transceiver unit further capable of generating a third signal having first and second binary states, wherein the step of providing a timing signal includes the sub-step of generating the second binary state of the third signal for each bit of the first portion.

16. The method of claim 14, the radiotelephone transceiver unit further capable of generating a third signal having first and second binary states, the method further comprising the step of generating the second binary state of the third signal before and during reception of either the first or second binary state of the first signal representative of the bits of the second portion.

17. A method of communicating a message in a data-transmission system including a master device and at least one slave device, the message having first and second portions wherein an address identifying the slave device is contained in the first portion and data is contained in the second portion, the first and second portions having a plurality of consecutive bits representative of the address and data, the master device capable of receiving a first signal having first and second binary states, the slave device capable of generating the first signal, the method comprising the steps of:

providing a timing signal;

in response to the timing signal, for each bit of the first portion, generating either the first or second binary state of the first signal representative of the bits of the first portion;

in response to the timing signal, receiving either the first or second binary state of the first signal representative of the bits of the first portion so that the address is synchronously received;

for each bit of the second portion, generating either the first or second binary state of the first signal representative of the bits of the second portion; and receiving either the first or second binary state of the first signal representative of the bits of the second portion so that the data is asynchronously received.

18. The method of claim 17 further comprising the steps of:

generating the first binary state of the first signal before generation of either the first or second binary state of the first signal representative of the bits of the first portion; and receiving the first binary state of the first signal before generation of either the first or second binary state of the first signal representative of the bits of the first portion.

19. The method of claim 17, the master device further capable of generating at least a second signal having first and second binary states and the slave device further capable of receiving at least the second signal, the method further comprising the steps of:

generating the second binary state of the second signal before and during generation of either the first or second binary state of the first signal representative of the bits of the first portion; and receiving the second binary state of the second signal before and during generation of either the first or second binary state of the first signal representative of the bits of the first portion.

20. The method of claim 17, the master device further capable of generating at least a second signal having first and second binary states and the slave device further capable of receiving at least the second signal, wherein providing a timing signal includes the sub-steps of:

generating the second binary state of the second signal for each bit of the first portion; and receiving the second binary state of the second signal for each bit of the first portion.

21. The method of claim 17, the master device further capable of generating at least a second signal having first and second binary states and the slave device further capable of receiving at least the second signal, the method further comprising the steps of:

generating the second binary state of the second signal before and during generation of either the first or second binary state of the first signal representative of the bits of the second portion; and receiving the second binary state of the second signal before and during reception of either the first or second binary state of the first signal representative of the bits of the second portion.

22. A method of communicating a message in a radiotelephone system including a radiotelephone transceiver unit and at least one radiotelephone peripheral, the message having first and second portions wherein an address identifying the at least one radiotelephone peripheral is contained in the first portion and data is contained in the second portion, the first and second portions having a plurality of consecutive bits representative of the address and data, the at least one radiotelephone peripheral capable of generating a first signal and receiving at least a second signal, the radiotelephone transceiver unit capable of receiving the first signal and generating at least the second signal, the first and second signals having first and second binary states, the method comprising the steps of:

generating the first binary state of the first signal;

receiving the first binary state of the first signal;

in response to generating the first binary state of the first signal, providing a timing signal;

in response to the timing signal, for each bit of the first portion, generating either the first or second binary state of the first signal representative of the bits of the first portion so that the address is synchronously transmitted;

in response to the timing signal, receiving either the first or second binary state of the first signal representative of the bits of the first portion so that the address is synchronously received;

for each bit of the second portion, generating either the first or second binary state of the first signal representative of the bits of the second portion so that the data is asynchronously transmitted; and receiving either the first or second binary state of the first signal representative of the bits of the second portion so that the data is asynchronously received.

23. The method of claim 22, the at least one radiotelephone peripheral further capable of receiving a third signal and the radiotelephone transceiver unit further capable of generating the third signal having first and second binary states, wherein providing a timing signal includes the sub-steps of:

generating the second binary state of the third signal for each bit of the first portion; and receiving the second binary state of the third signal for each bit of the first portion.

24. The method of claim 22, the radiotelephone transceiver unit further capable of generating a third signal having first and second binary states and the at least one radiotelephone peripheral further capable of receiving the third signal, the method further comprising the steps of:

generating the second binary state of the third signal before and during generation of either the first or second binary state of the first signal representative of the bits of the second portion; and receiving the second binary state of the third signal before and during reception of either the first or second binary state of the first signal representative of the bits of the second portion.

* * * * *